United States Patent
Stenneth

(10) Patent No.: US 11,681,294 B2
(45) Date of Patent: Jun. 20, 2023

(54) METHOD AND SYSTEM FOR PREDICTION OF ROADWORK ZONE

(71) Applicant: HERE GLOBAL B.V., Eindhoven (NL)

(72) Inventor: Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 583 days.

(21) Appl. No.: 16/217,938

(22) Filed: Dec. 12, 2018

(65) Prior Publication Data
US 2020/0192386 A1 Jun. 18, 2020

(51) Int. Cl.
G05D 1/02 (2020.01)
G01C 21/36 (2006.01)
G05D 1/00 (2006.01)

(52) U.S. Cl.
CPC ....... G05D 1/0214 (2013.01); G01C 21/3691 (2013.01); G01C 21/3697 (2013.01); G05D 1/0088 (2013.01); G05D 2201/0213 (2013.01)

(58) Field of Classification Search
CPC .............. G05D 1/0214; G05D 1/0088; G05D 2201/0213; G01C 21/3697; G01C 21/3691; G01C 21/3602; G06F 11/00
USPC .......................................................... 701/23
See application file for complete search history.

(56) References Cited

U.S. PATENT DOCUMENTS

| | | | |
|---|---|---|---|
| 9,141,107 B2 | 9/2015 | Ferguson et al. | |
| 9,221,461 B2 * | 12/2015 | Ferguson | B60W 30/12 |
| 9,582,004 B2 | 2/2017 | Rothoff et al. | |
| 9,632,502 B1 | 4/2017 | Levinson et al. | |
| 9,933,268 B2 | 4/2018 | Bagheri | |
| 2013/0211656 A1 | 8/2013 | An et al. | |
| 2014/0309833 A1 * | 10/2014 | Ferguson | G06K 9/00818 701/23 |
| 2015/0185027 A1 | 7/2015 | Kikkeri et al. | |
| 2017/0242436 A1 | 8/2017 | Creusot | |

FOREIGN PATENT DOCUMENTS

| | | | |
|---|---|---|---|
| WO | 2017144319 A1 | | 8/2017 |
| WO | WO2017144319 | * | 8/2017 |

OTHER PUBLICATIONS

Das et al., "M2BMT: An Automated Ground Truth Generation Algorithm for Lane Detection", Published in International Conference on Pattern Recognition Systems (ICPRS-16), Conference Paper, Apr. 2016, 6 pages.

* cited by examiner

Primary Examiner — Maceeh Anwari
(74) Attorney, Agent, or Firm — Ditthavong, Steiner & Mlotkowski

(57) ABSTRACT

A computer-implemented method for prediction of a roadwork zone on at least a second road segment is provided. The method comprises retrieving at least one of map data or first sensor data for at least a first road segment. The method also comprises retrieving ground truth data for at least the first road segment, the ground truth data indicating a true presence or a true absence of a roadwork zone on the at least first road segment. The method further comprises receiving second sensor data associated with the at least second road segment. The method further comprises generating roadwork zone data of the roadwork zone on the at least second road segment, based on the at least one of map data or the first sensor data, the ground truth data, and the second sensor data.

18 Claims, 13 Drawing Sheets

METHOD AND SYSTEM FOR PREDICTION OF ROADWORK ZONE

TECHNOLOGICAL FIELD

The present disclosure generally relates to prediction of roadwork zones in a geographical region, such as on a road; and more particularly relates to generating a trained machine learning model capable of predicting a presence or absence of roadwork zone on a road.

BACKGROUND

Providing environmental awareness for vehicle safety, particularly in autonomous driving, has been a primary concern for automobile manufacturers and related service providers. An autonomous vehicle should be able to identify its environment and take into account a variety of factors and make appropriate decisions. For example, knowing whether the road on which the vehicle is travelling is undergoing construction or any other kind of roadwork zone may be important. However, current autonomous or driver-assist vehicle systems may also be unable to adequately predict or respond to construction zones on roadways.

BRIEF SUMMARY

Therefore, there is a need to provide a more reliable technique for prediction of a roadwork zone on a road.

According to one embodiment, a computer-implemented method for prediction of a roadwork zone on at least a second road segment is provided. The method comprises retrieving at least one of map data or first sensor data for at least a first road segment. The method also comprises retrieving ground truth data for at least the first road segment, the ground truth data indicating a true presence or a true absence of a roadwork zone on the at least first road segment. The method further comprises receiving second sensor data associated with the at least second road segment. The method further comprises generating roadwork zone data of the roadwork zone on the at least second road segment. based on the at least one of map data or the first sensor data, the ground truth data, and the second sensor data.

According to another embodiment, a system for prediction of a roadwork zone on at least a second road segment is provided. The system comprises at least one memory configured to store computer program code instructions, and at least one processor configured to execute the computer program code instructions to retrieve at least one of map data or first sensor data for at least a first road segment. The system is also caused to retrieve ground truth data for at least the first road segment, the ground truth data indicating a true presence or a true absence of a roadwork zone on at least the first road segment. The system is further caused to receive second sensor data associated with the at least second road segment. The system is further caused to generate roadwork zone data of the roadwork zone on the at least second road segment, based on the at least one of map data or the first sensor data, the ground truth data, and the second sensor data.

According to yet another embodiment, a non-transitory computer-readable storage medium for prediction of a roadwork zone on at least a second road segment is provided, carrying one or more sequences of one or more instructions which, when executed by one or more processors, cause an apparatus to perform: retrieving at least one of map data or first sensor data for at least a first road segment; retrieving ground truth data for at least the first road segment, the ground truth data indicating a true presence or a true absence of a roadwork zone on the at least first road segment; receiving second sensor data associated with the at least second road segment; and generating roadwork zone data of the roadwork zone on the at least second road segment, based on the at least one of map data or the first sensor data, the ground truth data, and the second sensor data.

According to one or more embodiments, a trained machine learning model is generated based on the at least one of map data or the first sensor data, and the ground truth data; and subsequently the roadwork zone data is generated by the trained machine learning model based on the second sensor data.

According to one or more embodiments, the first sensor data and the second sensor data comprises information about presence or absence of one or more of roadwork announcement signs, chicane announcement signs, speed limit signs, passing restriction signs, lane shift signs and lane markings change for the respective first road segment and the second road segment. Further, the map data comprises information about one or more of functional class, number of lanes, speed limits, rural flag, urban flag, tunnel flag and bridge flag associated with the road.

According to one or more embodiments, an increasing speed funnel for the respective first road segment and the second road segment is determined based on two or more consecutive speed limit signs indicating gradual reduction in speed limit for the corresponding first road segment and the second road segment. Further, a decreasing speed funnel for the respective first road segment and the second road segment is determined based on two or more consecutive speed limit signs indicating gradual increase in speed limit for the corresponding first road segment and the second road segment.

According to one or more embodiments, a start of the roadwork zone on the second road segment for a vehicle is predicted, by the trained machine learning model, based on the second sensor data indicating presence of one or more of roadwork announcement signs, chicane announcement signs, passing restriction signs, lane shift signs and lane markings change on the second road segment, and/or based on the determined increasing speed funnel for the second road segment, ahead of the vehicle. Further, an end of the roadwork zone on the second road segment for a vehicle is predicted, by the trained machine learning model, based the second sensor data indicating at least one of absence of one or more of roadwork announcement signs, chicane announcement signs, passing restriction signs, lane shift signs and lane markings change within a predetermined length of the second road segment, and presence of speed limit increasing signs on the second road segment, and/or based on the determined decreasing speed funnel for the second road segment, ahead of the vehicle.

According to one or more embodiments, road features are determined based on the map data. The road features comprise information about one or more of roadwork zone definition based on a location of the road and historical speed of vehicles on the road. Further, the generated roadwork zone data is validated based on the determined road features.

According to one or more embodiments, an autonomous driving mode of a target vehicle travelling on the road is deactivated based on the trained machine learning model predicting start of the roadwork zone on the second or further road segment ahead of the target vehicle. Further, an autonomous driving mode of a target vehicle travelling on the road is activated based on the machine learning model predicting end of the roadwork zone on the second road segment ahead of the target vehicle.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) may be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details may be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, system, and computer program for prediction of a roadwork zone are disclosed herein. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
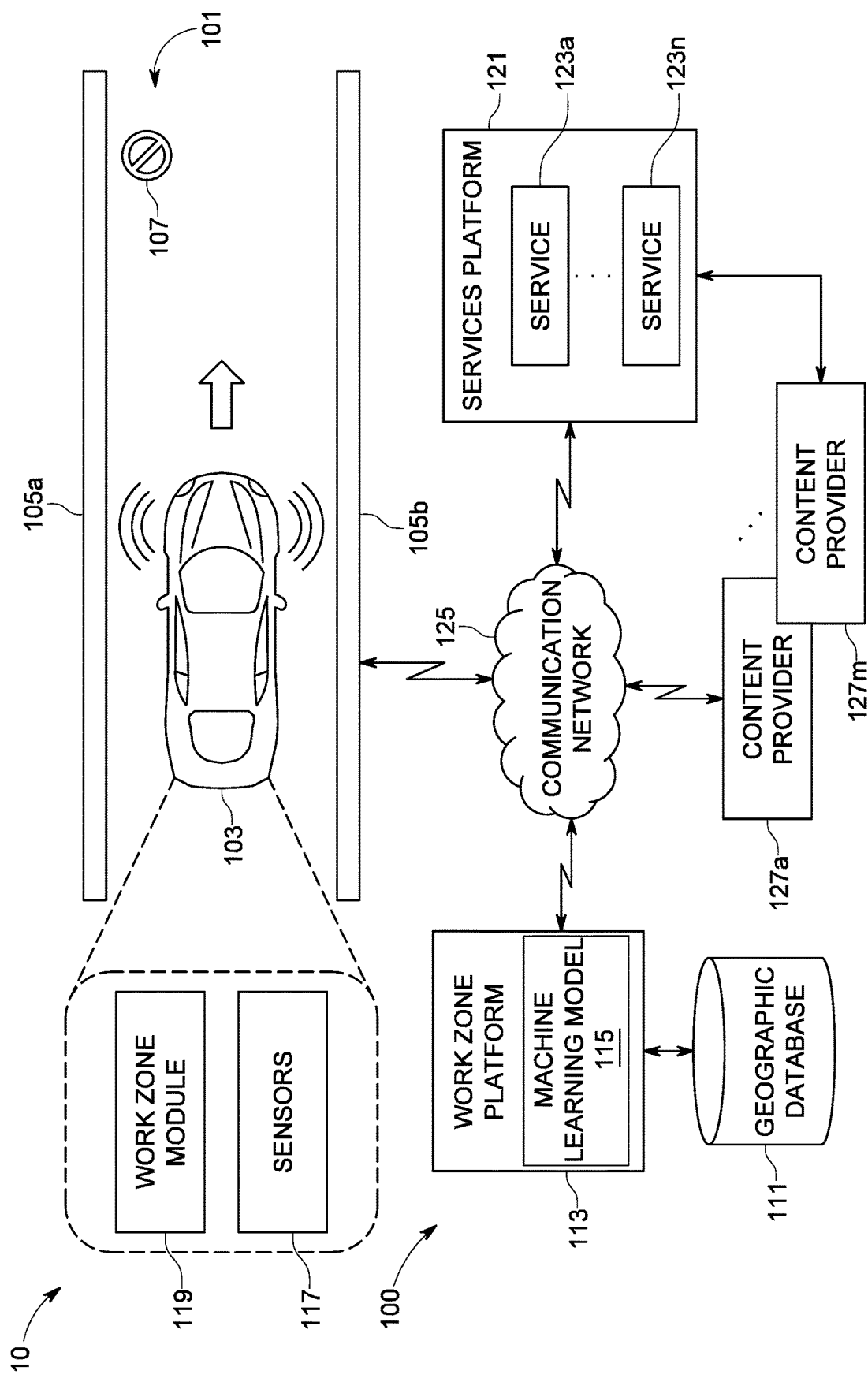
FIG. 1 is a depiction of a navigation scenario in which a system for prediction of roadwork zone is being implemented, according to one embodiment.

FIG. 1 is a diagram of a navigation scenario 10 in which a system 100 is implemented for prediction of roadwork zone on a road, according to one embodiment. The system 100 may be embodied as a cloud-based service that is remotely located with respect to vehicles travelling on the road. Having knowledge of whether the road ahead is undergoing roadwork zone may provide important situational awareness and improved safety to vehicles, particularly autonomous vehicles that operate with reduced or no human driver input. In other words, an understanding of whether there is roadwork zone ahead on a road segment on which the vehicle is travelling is crucial for an autonomous vehicle to safely plan a route. For example, in the navigation scenario 10 as shown in FIG. 1, the system 100 may be implemented for prediction of roadwork zone on an exemplary road or road segment 101 which may support traffic with a vehicle 103 traveling thereon. In this example, the road segment 101 may extend between a first physical divider 105a and a second physical divider 105b.

As illustrated in FIG. 1, the road segment 101 is shown with a roadwork zone (as designated by numeral 107) that may be defined due to some roadwork, i.e. the road segment 101 undergoing roadwork. Herein, the roadwork zone may be defined as any temporary intervention that reduces capacity from the road network. Roadwork zones may be a major source of disruption when there is insufficient practical reserve capacity in the road network. Due to the varying nature of roadworks, there are no explicit instructions on the configuration and coordination of roadworks. The Design Manual for Roads and Bridges (DMRB) (Department for Transport, 2012a), the Manual of Contract Documents for Highway Works (MCHW) (Department for Transport, 2012b) and the Traffic Signs Manual (Department for Transport, 2009) contain guidelines which focus on the safety requirements of the roadwork layout rather than the geometric layout. The Department for Transport (2008) has produced signal timing guidelines for contractors to assist with programming temporary traffic signals.

When there is a roadwork zone, traffic management such as temporary traffic signals or width restrictions may be introduced. In general, when a vehicle encounters roadwork, the vehicle may have to change its speed and/or direction. Herein, the roadwork may be defined as any obstacle, object or event, on the road which causes a vehicle to change its speed and/or direction. The roadwork may be classified as per US Department of Transportation which defines that the roadwork zone (roadwork) extends from the first warning sign or flashing lights on a vehicle to the "End of Roadwork" sign or the last traffic control device. The roadwork zone may include any type of construction or repair work, and may comprise one or more of road repair work, road expansion work, road construction work, road pavement work and the like. Hereinafter, the terms "roadwork zone" and "roadwork" have been interchangeably used without any limitations.

Figure 2A:
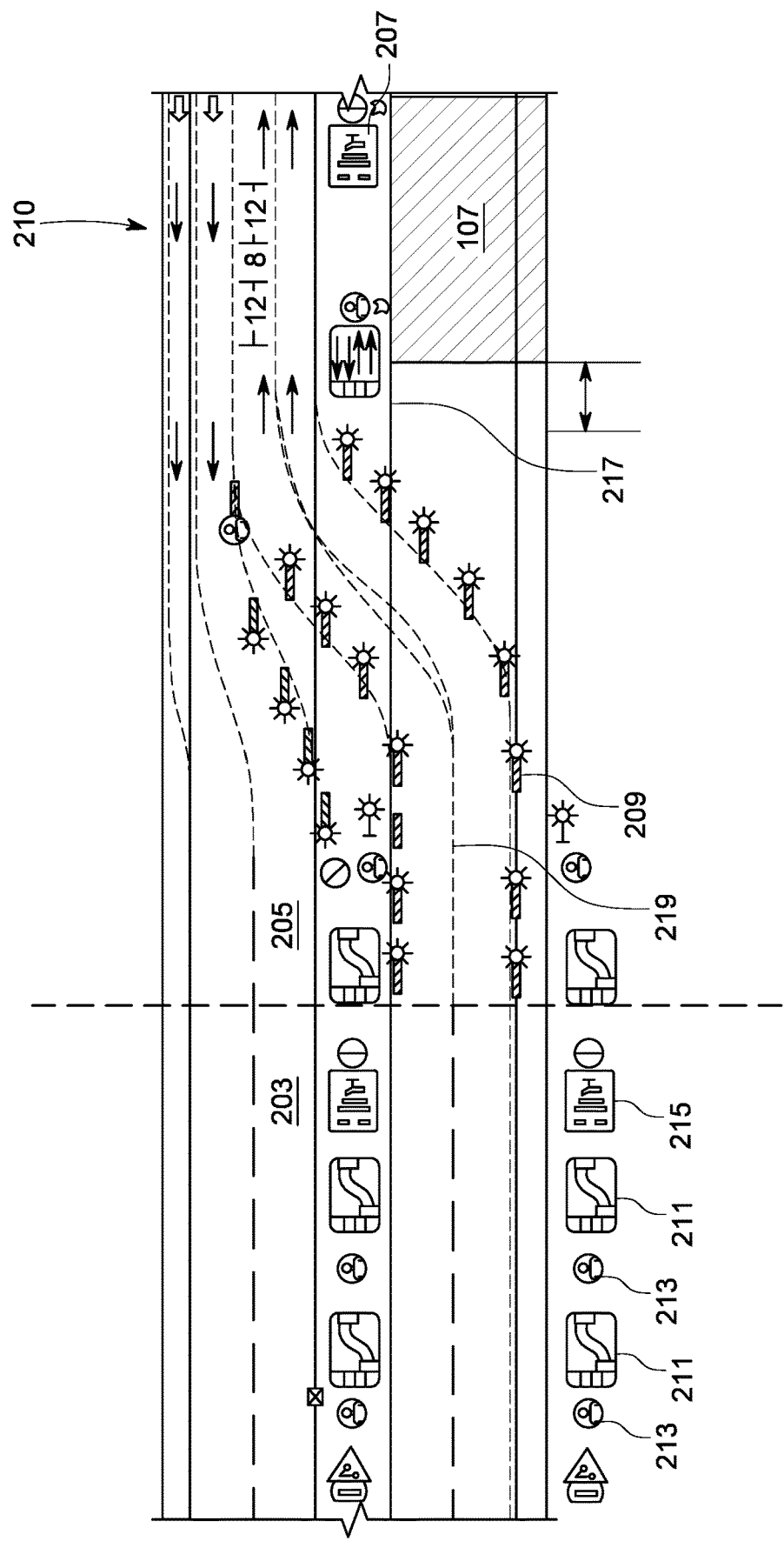
FIGS. 2A-2B are diagrams illustrating exemplary arrangements of indicators for use in prediction of roadwork zone, according to one embodiment.
Figure 2B:
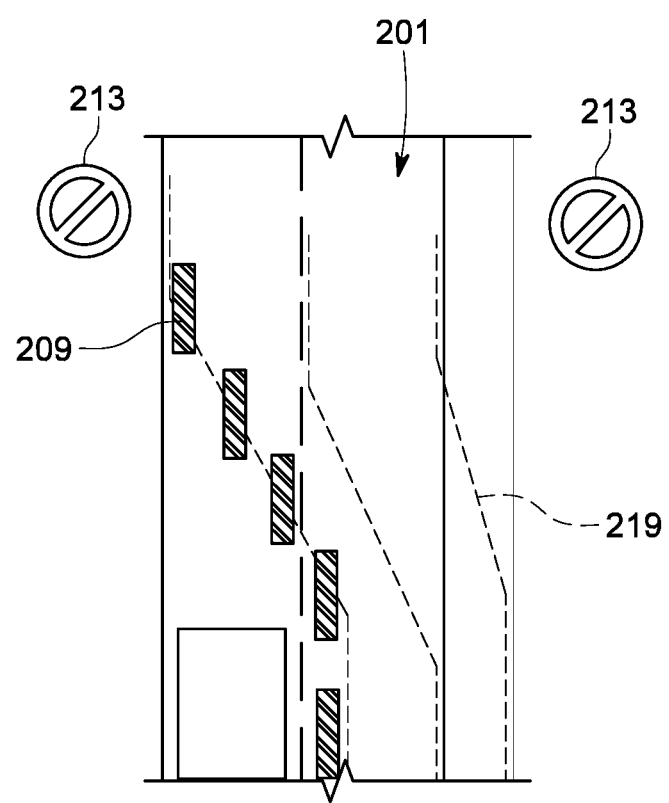

Traditionally, vehicles are warned about a roadwork zone ahead on the road segment 101 using one or more of roadwork announcement signs, chicane announcement signs, speed limit signs, passing restriction signs, lane shift signs and lane markings change. FIG. 2A illustrates a diagrammatic view of a road or a road segment 201 with two portions, a first road portion 203 and a second road portion 205 divided by a vertical dashed line. Herein, the second road portion 205 is shown to be undergoing roadwork, and thereby the vertical dashed line is representative of start of roadwork zone on the road 201. As may be seen, the first road portion 203 and the second road portion 205 may have different types of indicators arranged or installed therein, including one or more of roadwork announcement signs (such as, roadwork announcement sign 207 and roadwork markers 209), chicane announcement signs (such as, chicane announcement sign 211), speed limit signs (such as, speed limit sign 213), passing restriction signs (such as, passing restriction sign 215), lane shift signs (such as, lane shift sign 217) and lane markings change (such as, lane markings change 219). These different signs arranged, for example on the first road portion 203, represent a formal notice to the vehicles to decelerate due to a roadwork zone (roadwork) approaching ahead on the second road portion 205. The lane marking is typically a bright colored tape, such as, yellow lane marking, which may be extending along length of the road segment 201 undergoing roadwork. As may be seen, generally, the lane markings change 219 may be extending in the second road portion 205. FIG. 2B illustrates a diagrammatic view of the road segment 201 showing an end of the roadwork zone on the road 201. As may be seen, the lane markings change 219 and the roadwork markers 209 are arranged to allow the vehicle to use full stretch of the word 201, and further the speed limit signs 213 indicate no particular speed limit (or may have increased speed limit from previous speed limit sign). It may be appreciated that other kinds of warning signs may additionally be used to indicate the roadwork including, but not limited to, caution sign, road barriers, construction site delineator posts, guardrails, guide walls, etc. without any limitations.

Herein, the different indicators notate a gradual change in traffic speed (herein, referred to as "speed funnel"). The speed funnel may refer to a group of two or more speed limit signs indicating a change in sign values of speed limit signs from one end of the speed funnel to the other. A speed funnel may be used as an indication for a roadwork zone, an upcoming tunnel on a pathway, or a transition from a highway to a ramp. Conventionally, the speed funnel may be indicated well ahead of the roadwork zone, generally even before where the indicators are arranged on the road 201. In an embodiment, an increasing speed funnel for the road 201 is determined based on two or more consecutive speed limit signs 213 indicating gradual reduction in speed limit for the road. Further, a decreasing speed funnel for the road is determined based on two or more consecutive speed limit signs 213 indicating gradual increase in speed limit for the road. It may be appreciated that the system 100 may implement a vehicle with an imaging device or the like to read speed limit numbers on the speed limit signs 213 using character recognition techniques or the like.

The system 100 of the present disclosure (as illustrated in FIG. 1) provides prediction about roadwork zone on a road segment using computational techniques by processing sensor data and/or map data. The present system 100 first trains a machine learning model 115 (e.g., a supervised learning algorithm implementing Random Forest, Decision Tree, Neural Net, or equivalent techniques) using map data, sensor data or a combination thereof, and thereby use the trained machine learning model 115 to make prediction about presence or absence of roadwork zone, and even start and end of roadwork zone, on a road segment. In the illustrated example of FIG. 1, the system 100 is being implemented to have the sensor data collected and making prediction about roadwork zone 107 for the vehicle 103 travelling on the road segment 101. It may be appreciated that initially first sensor data may be collected and retrieved from a set of vehicles, such as OEM vehicles; and second sensor data associated with the vehicle 103 (herein, the beneficiary vehicle) may be utilized for making prediction about presence or absence of roadwork zone ahead in the direction of travelling of the vehicle 103.

In one embodiment, as illustrated in FIG. 1, the system 100 includes a roadwork zone platform 113 to predict the roadwork zone 107 on a road segment of interest in the road segment 101 based on map data associated with the road segment of interest, sensor data collected from plurality of vehicles equipped with an array of sensors 117, or a combination thereof. The roadwork zone platform 113 may predict the other characteristics that are related to or associated with the presence/absence of the roadwork zone 107 directly with the machine learning model 115 (e.g., if the machine learning model 115 has been trained accordingly). In one embodiment, at least one vehicle (e.g., vehicle 103) may be associated with a roadwork zone module 119 working in cooperation with the sensors 117 to extract sensor data. The roadwork zone module 119 may be part of the system 100 and be configured to perform one or more functions associated with detection of the roadwork 107 alone or in combination with the roadwork zone platform 113. In some examples, the roadwork zone platform 113 and the roadwork zone module 119 may be integrated into one module without any limitations. In one or more embodiments, the components and processes of the system 100 of the present disclosure may also be implemented in a standalone device or an apparatus (similar to the system 100) without any limitations.

Figure 6:
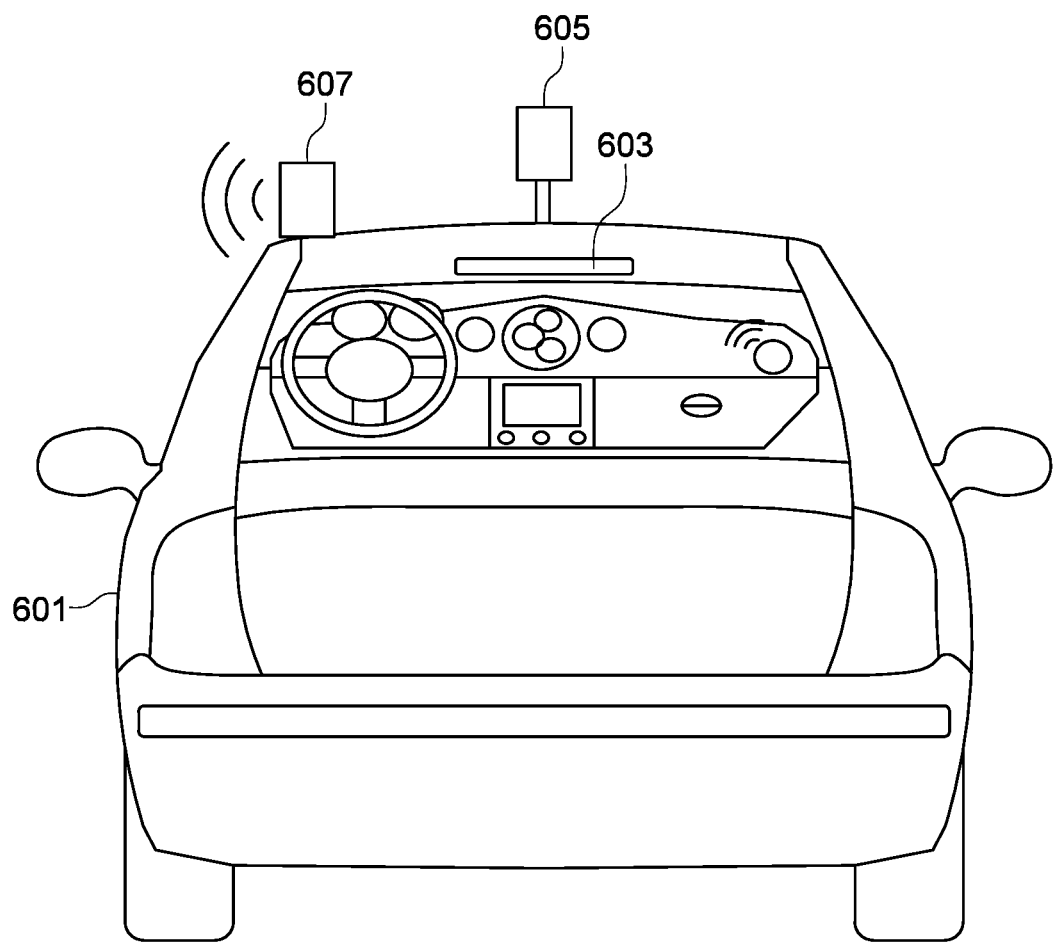
FIG. 6 is a diagram illustrating an example of a vehicle equipped with sensors to support prediction of roadwork zone, according to one embodiment.

In particular, the system 100 may utilize sensor data collected from vehicles (e.g., the vehicle 103 equipped with the array of sensors 117). In some example embodiments, the vehicles may capture different indicators observations and may transmit the different indicators observations to an OEM cloud and the system 100 may retrieve the different indicators observations from the OEM cloud. In some example embodiments, the different indicators observations may be directly retrieved by the system 100 from the vehicles in a dynamic manner. Still in some example embodiments, the vehicles may determine one or more speed funnels from the different indicators observations and may report the data pertaining to the determined one or more speed funnels to the system 100. In one or more embodiments, the sensors 117 may include an imaging device (such as, imaging device 603 and/or 605 as shown in FIG. 6). The imaging device may be installed on the vehicle 103 in a manner to gather images of the road segment 101. The imaging device, or the roadwork zone module 119 associated therewith, may be configured to capture one or more images of the different signs (as discussed above with reference to FIG. 2), and analyze the captured images data to determine information associated with the different signs. The imaging device may further be configured to detect presence of the lane marking change and determine information about required change in direction therefrom by discerning a typical bright color of the lane marking (such as, yellow color) from a background of the road (which is generally grey color) ahead thereof. Such determined information, in turn, may be utilized to predict presence or absence of roadwork zone 107 on the road segment 101, as discussed further in detail.

In some embodiments, the system 100 may also utilize sensor data collected from vehicles (e.g., the vehicle 103 equipped with the array of sensors 117) for generating traffic behavior change data (based on the determined change in traffic behavior). In particular, the system 100 determines the change in traffic behavior by analyzing change in one or more of nominal speed and traffic direction of other vehicles travelling ahead on the road segment 101. In one or more examples, the system 100 may utilize the images taken by the imaging device itself to analyze change in the nominal speed and the traffic direction of other vehicles travelling ahead on the road segment 101. Such analysis may be implemented by, for example, the imaging device itself, or the roadwork zone module 119 associated therewith, and may employ image processing and machine learning techniques which are generally known in the art. In other embodiments, the system 100 may determine the change in traffic behavior on the road segment 101 based on received information. In particular, the sensors 117 may include a communication device (such as, communication device 607 as shown in FIG. 6) which may be utilized to implement one or more of vehicle-to-infrastructure communication, vehicle-to-vehicle communication and traffic report broadcast to receive information related to the traffic behavior. The system 100 may determine the change in traffic behavior on any of the road segment 101 by monitoring and processing the said vehicle-to-infrastructure communication, vehicle-to-vehicle communication and traffic report broadcast corresponding to that road segment 101, as may be contemplated by a person skilled in the art. In some example embodiments, individual vehicles may report their average speeds computed for a predetermined period of time to the system 100 periodically. The roadwork zone platform 113 may thus determine the change in traffic behavior based on the reported average speeds. Any suitable technique may be utilized for the aforesaid objective.

Figure 3:
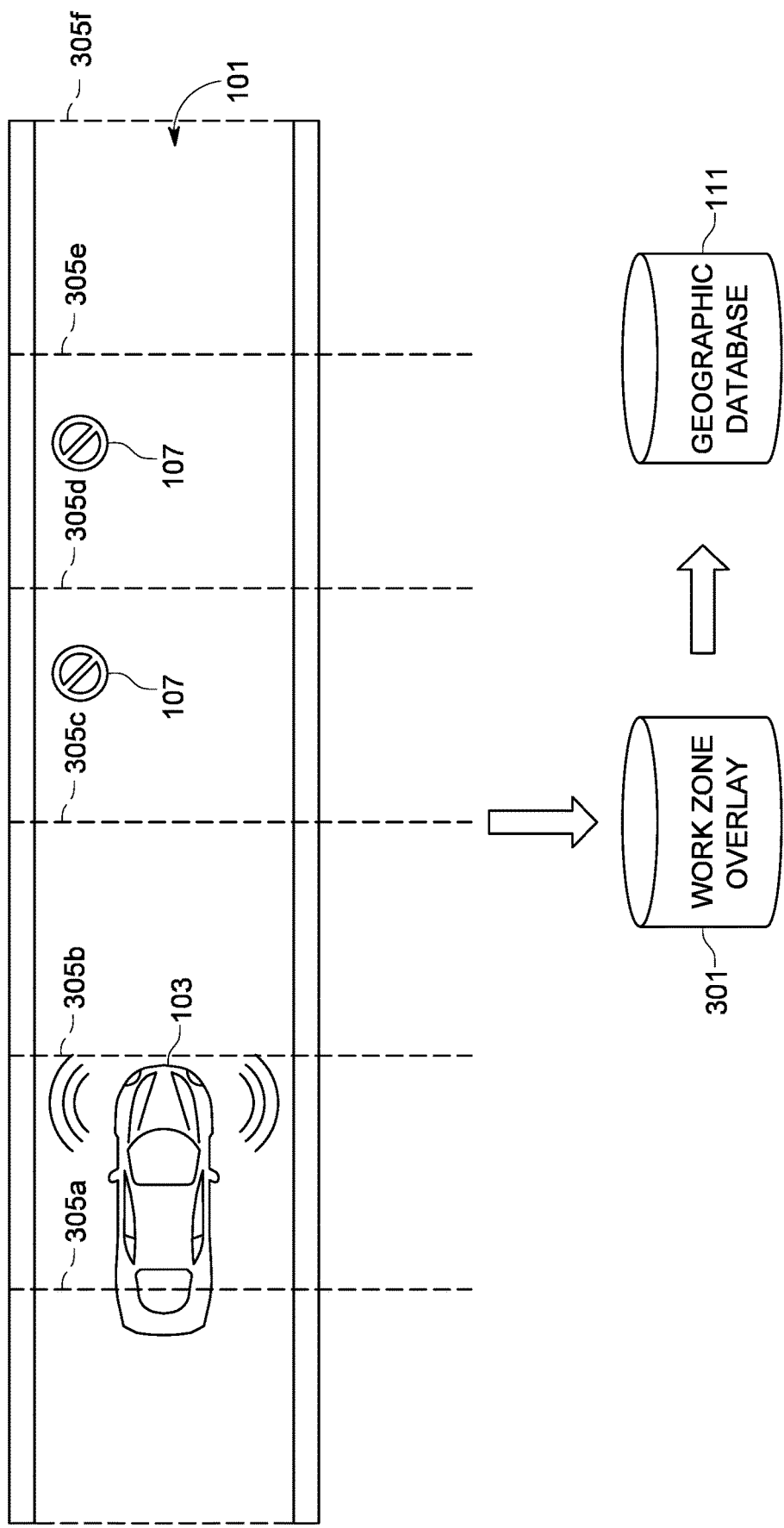
FIG. 3 is a diagram illustrating a process for creating a roadwork zone overlay for road segments, according to one embodiment.

In some embodiments, the roadwork zone platform 113 segments the road 101 represented in a map database (e.g., a geographic database 111, as also illustrated in FIG. 1) into segments of a predetermined length. Then, the roadwork zone platform 113 may provide roadwork zone predictions for each road segment. FIG. 3 is a diagram illustrating an example process for creating a roadwork overlay 301 for the road segments 101, according to one embodiment. In one embodiment, the roadwork overlay 301 is a data structure that may be associated with the geographic database 111. The roadwork overlay 301 stores, for instance, parametric representations of predicted roadwork 107 and/or other related attributes in association with the corresponding road segments 101. As shown, the roadwork zone platform 113 segments the road 101 into segments 305a-305f (also collectively referred to as segments 305). The roadwork zone platform 113 may then collect map data and sensor data from vehicles (e.g., the vehicle 103) as the vehicles traverse each segment 305a-305f of the road 101.

As shown, the roadwork zone platform 113 segments the road 303 into segments 305a-305f (also collectively referred to as segments 305). The length of each segment provides for a corresponding level of granularity required for determination of roadwork zones. For example, a default length of the segments 305 can be 5-meters so that each segment 305 represents a 5-meter long portion of the road 303. In one embodiment, shorter segment lengths can be used if a higher resolution of detection of the roadwork zone 307a-307b is desired, and longer segment lengths can be used to reduce memory storage requirements. The roadwork zone platform 113 can then collect map data and vehicular sensor data from vehicles (e.g., vehicles 103 and 105) as the vehicles traverse each segment 305a-305f of the road 303.

In one embodiment, based on the collected map and/or sensor data, the roadwork zone platform 113 predicts the presence or absence of the roadwork zones 307a-307b using a trained machine learning model (e.g., machine learning model 115) for each segment 305 to store in the roadwork zone overlay 301. Table 1 below illustrates an example of the predictions based on the example of FIG. 3:

TABLE 1

| Segment | Roadwork zone |
|---------|---------------|
| 305a | Absent |
| 305b | Absent |
| 305c | Absent |
| 305d | Present |
| 305e | Present |
| 305f | Absent |

In some embodiments, the predicted roadwork zone 107 can then be used to determine how to operate an autonomous vehicle (as discussed in more detail in subsequent paragraphs). For example, if a roadwork zone 107 is predicted to be present based on map data and/or vehicle sensor data on a road segment (e.g., because no previously determined ground truth data on roadwork zones is available for the road segment), then a more autonomous operation of the vehicle can be disabled, and the driver is expected to drive in more of a manual mode (e.g., requiring the driver to hold the steering wheel as the vehicle operates otherwise in autonomous mode, or to disable some or all autonomous operations). In one embodiment, other use cases include updating the roadwork zone overlay 301 and/or geographic database 111 with the newly detected roadwork zones. It is noted that these uses cases are provided by way of illustration and not as limitations.

Figure 4:
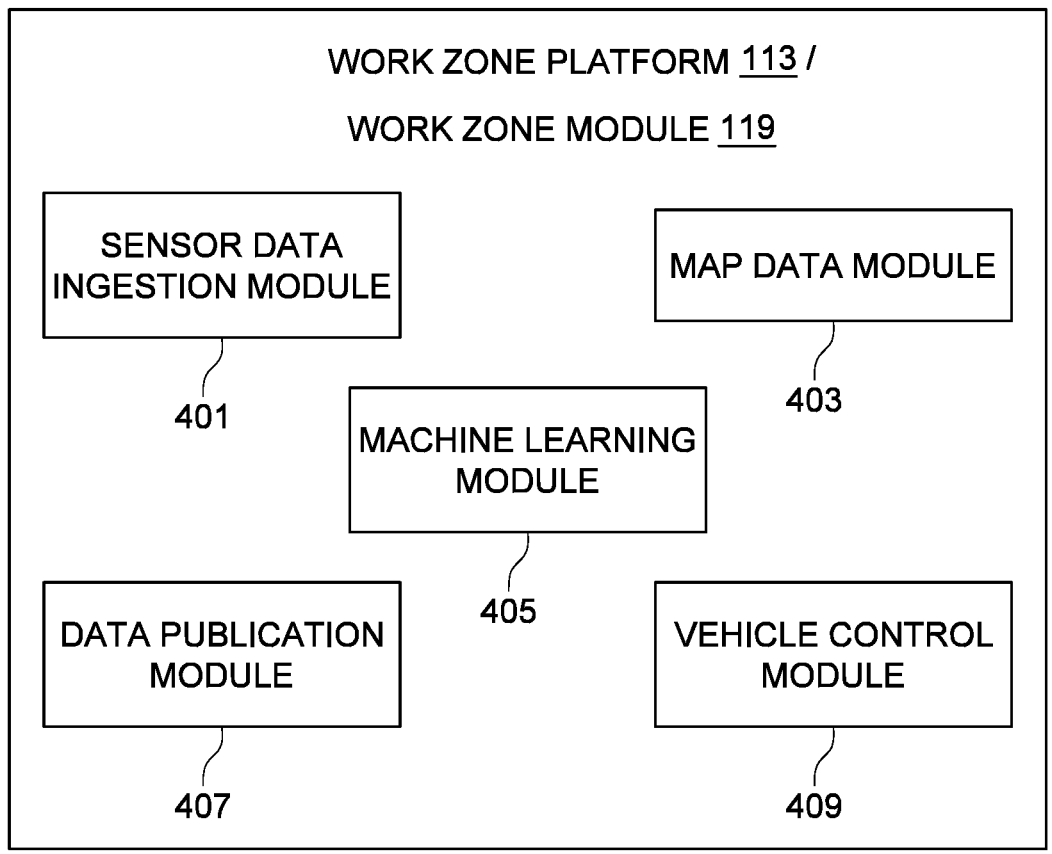
FIG. 4 is a diagram of the components of a roadwork zone platform, according to one embodiment.

FIG. 4 is a diagram of the components of the roadwork zone platform 113 and/or the roadwork zone module 119, according to one embodiment. By way of example, the roadwork zone platform 113 and/or the roadwork zone module 119 includes one or more components for provide machine learning and prediction of roadwork zone on a road, according to the various embodiments described herein. It is contemplated that the functions of these components may be combined or performed by other components of equivalent functionality. In this embodiment, the roadwork zone platform 113 may include a sensor data ingestion module 401, a map data module 403, a machine learning module 405, a data publication module 407, and a vehicle control module 409. The above presented modules and components of the roadwork zone platform 113 may be implemented in hardware, firmware, software, or a combination thereof. Though depicted as separate entities in FIG. 1, it is contemplated that the roadwork zone platform 113 may be implemented as a module of any of the components of the system 100; e.g., a component of the vehicle 103, services platform 121, services 123a-123n (also collectively referred to as services 123), etc. In another embodiment, one or more of the modules 401-409 may be implemented as a cloud based service, local service, native application, or a combination thereof. The functions of the roadwork zone platform 113, roadwork zone module 119, and modules 401-409 are discussed with respect to FIGS. 5-9 below.

Figure 5:
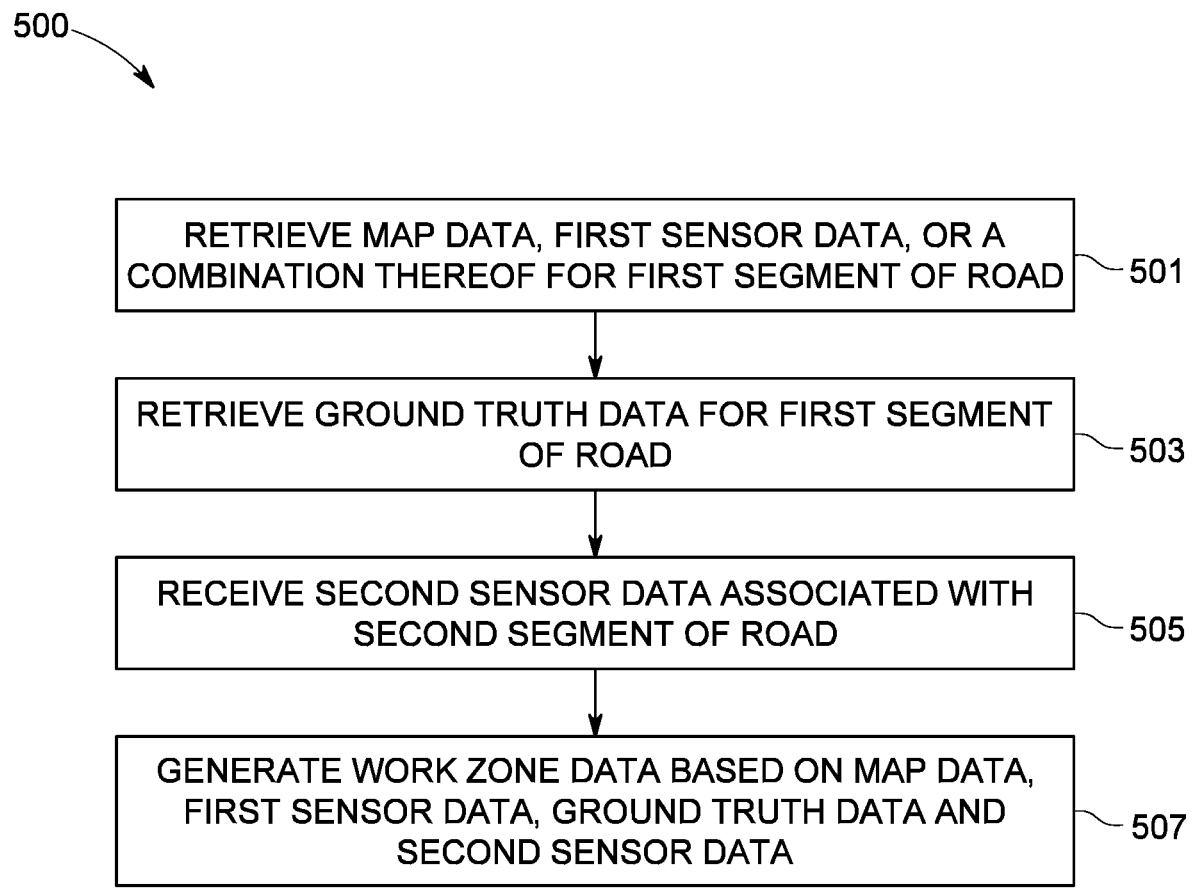
FIG. 5 is a flowchart of a method for prediction of roadwork zone, according to one embodiment.
Figure 12:
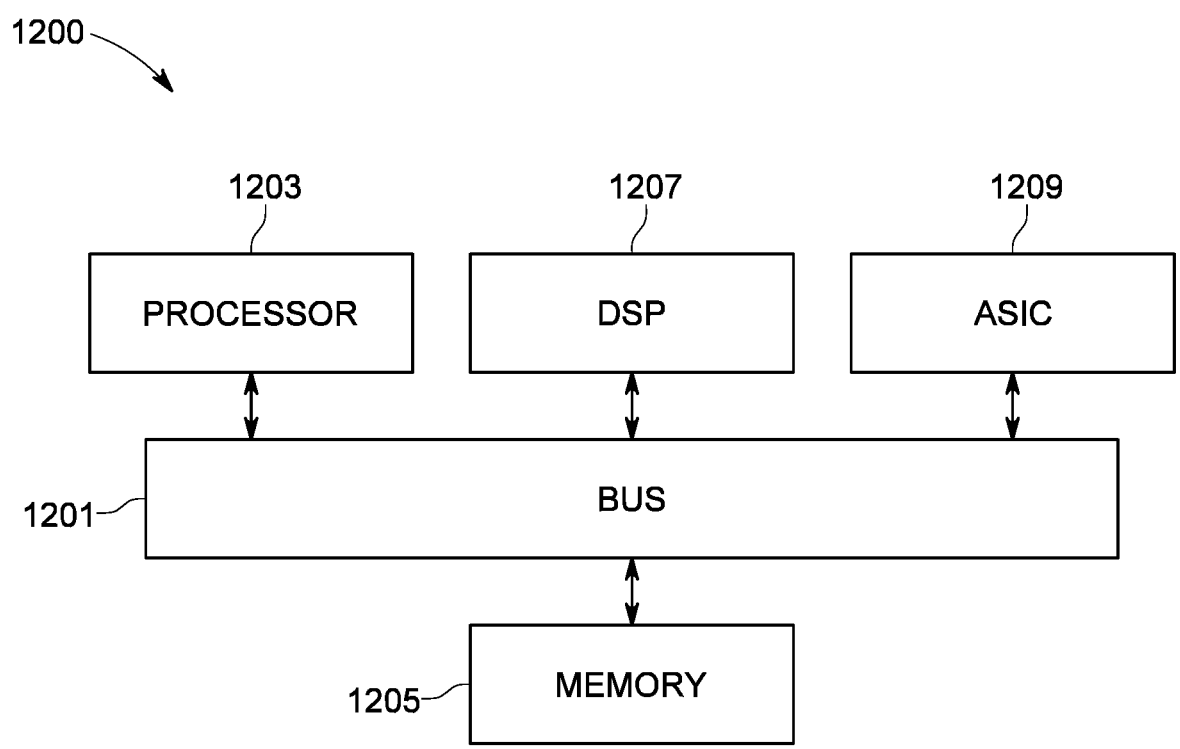
FIG. 12 is a diagram of a chip set that may be used to implement an embodiment.

FIG. 5 is a flowchart of a method 500 for providing machine learning and prediction of roadwork zone on a road segment, according to one embodiment. Herein, the road 101 has been arbitrarily defined to include two segments, a first road segment and a second road segment which may or may not overlap each other. In some example embodiments, the two road segments—first road segment and the second road segment may each correspond to different roads. In various embodiments, the roadwork zone platform 113, the roadwork zone module 119, and/or any of the modules 401-409 may perform one or more portions of the method 500 and may be implemented in, for instance, a chip set including a processor and a memory as shown in FIG. 12. As such, roadwork zone platform 113, roadwork zone module 119, and/or any of the modules 401-409 may provide means for accomplishing various steps of the method 500, as well as means for accomplishing embodiments of other processes described herein in conjunction with other components of the system 100. Although the method 500 is illustrated and described as a sequence of steps, its contemplated that various embodiments of the method 500 may be performed in any order or a combination and need not include all of the illustrated steps. The method 500, for instance, describes the process for using map data, sensor data or a combination thereof for predicting the roadwork zone on a given road segment.

At step 501, the method 500 includes retrieving at least one of map data or first sensor data for the first road segment. Herein, the first road segment corresponds to the segment for which the sensor data has been collected by plurality of vehicles, such as OEM vehicles, before-hand, and the first sensor data relates to collected sensor data corresponding to the first road segment. Herein, the first sensor data includes information about presence or absence of one or more of roadwork announcement signs, chicane announcement signs, speed limit signs, passing restriction signs, lane shift signs and lane markings change for the first road segment. Herein, the speed limits may be static speed limit or dynamic speed limits associated with the first road segment. Further, the map data includes information about one or more of functional class, number of lanes, speed limits, rural flag, urban flag, tunnel flag and bridge flag associated with the road. Such information from the map data may be additional to or supplement the sensor data for performing various analysis. In most cases, the map data may generally be applicable for all segments throughout the length of the road 101. Herein, the roadwork zone platform 113 may use a map database (e.g., the geographic database 111) for defining segments on the road 101, as discussed above. Further, the sensor data ingestion module 401 may be used to retrieve sensor data, and the map data module 403 may be used to retrieve map data for given road segments.

FIG. 6 is a diagram illustrating an example of a vehicle 601 equipped with sensors to capture the different indicators associated with the sensor data. As shown, a vehicle 601 may be equipped with an imaging device, such as, one or more of a camera sensor 603, a LiDAR sensor 605 (and/or RADAR sensor 605), a position sensor, a motion sensor and the like. Each of these sensors 603 and 605 are capable of sensing the presence of a lane marking and a speed funnel individually. Further, the sensors 117 may include a communication device 607 to communicate sensor data to a cloud sever and/or retrieve sensor data directly from other vehicles or traffic infrastructure with connected communications capabilities (e.g., cellular or other wireless communications equipped vehicles) or from an Original Equipment Manufacturer (OEM) provider (e.g., automobile manufacturer) operating an OEM platform (e.g., a services platform 123) that collects sensor data from vehicles manufactured by or otherwise associated with the OEM. The retrieval of the sensor data and/or the map data may occur in real-time or near real-time, continuously, periodically, according to a schedule, on demand, etc.

In some examples, the sensor data ingestion module 401, for instance, may fuse data from these multiple different sensors 603-607 to increase consistency of detection of the different indicators. In some embodiments, the sensor data ingestion module 401 may also pre-process the collected raw sensor data to provide the sensor data for training of the machine learning model 115 for better prediction of the roadwork thereby. In one embodiment, the sensor data is retrieved from a plurality of in-vehicle sensors installed in multiple vehicles traveling the road. The sensor data ingestion module 401 may use such sensor data from multiple vehicles traveling on the same road segment to determine additional attributes or features for lane marking data, speed funnel presence data, and traffic behavior change data.

In one embodiment, the sensor data ingestion module 401 may also use sensor data from multiple vehicles traveling on the same road segment to determine additional attributes or features for machine learning. For example, the sensor data ingestion module 401 may process the sensor data from a plurality of vehicles traveling the road segment to determine or calculate a derivative feature. A derivative feature refers to any feature or attribute that can be calculated or processed from the raw data from multiple vehicles (e.g., not directly sensed by a sensor 603-607). For example, the derivative feature can include, but is not limited to, the number of positive observations of the roadwork zone 107 by unique vehicles traveling the road segment. In one embodiment, this number of positive observations can be normalized by the total number of drives or vehicles that passed the given segment.

In an embodiment where the map data is used alone or in combination with the sensor data, the map data module 403 may retrieve requested map data for a road segment of interest by performing a location-based query of the geographic database 111 or equivalent. By way of example, the map data may include any attribute of the road segment or corresponding map location stored in the geographic database 111. As discussed, the retrieved map data may include, but is not limited to, functional class, number of lanes, speed limits, rural flag, urban flag, tunnel flag and bridge flag associated with the road, or a combination thereof.

In one embodiment, the sensor data may be provided as location trace data in which each sensor data sampling point is associated with location coordinates of the collection vehicle. The location coordinates may be determined from location sensors (e.g., GPS/satellite-based location sensors or equivalent) and recorded with the sensor data. In this case, the sensor data ingestion module 401 may perform a map matching (e.g., using any map matching technique known in the art) of the location data of each sensor data sampling point to identify which road segment the sensor data sampling point belongs. In other words, each location trace is associated with segments of map road links and transformed into sensor data observations for a particular road segment. For example, the data ingestion module 401 may use a path-based map matching algorithm by calculating the collection vehicle's direction of travel from the time stamp and GPS points present in the retrieved sensor data.

After retrieval of the map data, sensor data, and/or derivative feature, the machine learning module 405 may process the data to extract a feature vector comprising the attributes indicated in the map data, the sensor data, the derivative feature, or a combination thereof. This feature vector can then be provided as an input to the machine learning module 405 to train the machine learning model 115. When used for training the machine learning model 115, the feature vector can be part of a training data set. When used for actual prediction, the feature vector is provided as an input to a trained machine learning model 115 for predicting the presence/absence of a roadwork zone 107 at a corresponding road segment of interest.

At step 503, the method 500 includes retrieving ground truth data for at least the first road segment, the ground truth data indicating a true presence or a true absence of a roadwork zone on at least the first road segment. That is, with respect to the training use case, after creating the feature vector as described above for inclusion in a training data set, the machine learning module 405 retrieves ground truth data about a wok zone 107 for the road segment. The ground truth data, for instance, indicates a true presence or a true absence of the roadwork zone 107 on the road segment of interest. This ground truth data can be collected using traditional or equivalent techniques (e.g., manual human annotation of a collected sensor data observation to indicate presence or absence of a roadwork zone 107 and/or its type or characteristics). For example, a map service provider can operate a fleet of map data collection vehicles that can more sophisticated, accurate, or different types of sensors (e.g., radar, cameras, LiDAR, etc.) than would normally be available in customer vehicles. In one embodiment, only segments for which ground truth data is collected or otherwise available are selected for training the machine learning model.

In one embodiment, when independent ground truth data is not available or otherwise not used, the machine learning module 405 can use the underlying sensor data individually to estimate whether a roadwork zone is present or absent on the corresponding road segment. For example, image recognition can be performed on camera sensor data collected from a vehicle traveling the road segment. If image recognition results in detecting the presence or absence a roadwork zone in the image data, the results can be used as pseudo-ground truth data to train the machine learning model 115. In this way, when operating with independent ground truth data, map and sensor data collected from one road segment can be used to train the machine learning model 115 to predict the presence or absence of roadwork zones on other road segments.

At step 505, the method 500 includes receiving second sensor data associated with at least a second road segment. Herein, the second road segment corresponds to the segment for which the prediction about the presence or absence of roadwork zone has to be made, and the second sensor data relates to collected sensor data corresponding to the second road segment. For example, for a vehicle travelling on the road 101, the second road segment may usually be portion of the road 101 ahead in the direction of travel thereof. As discussed, the second sensor data, like the other sensor data, may be retrieved from the sensors 117 and/or the roadwork zone module 119 (via the sensor data ingestion module 401). Herein, the second sensor data includes information about presence or absence of one or more of roadwork announcement signs, chicane announcement signs, speed limit signs, passing restriction signs, lane shift signs and lane markings change for the second road segment. Herein, the speed limits may be static speed limit or dynamic speed limits associated with the second road segment.

At step 507, the method 500 includes generating roadwork zone data of the roadwork zone on at least the second road segment based on the at least one of map data or the first sensor data, the ground truth data, and the second sensor data. In addition to the ground truth data and the second sensor data, one or both of the map data and the first sensor data may be utilized for this purpose. In particular, the method 500 first includes generating a trained machine learning model based on one or more of the map data or the first sensor data, and the ground truth data, and then generating, by the trained machine learning model, the roadwork zone data of the roadwork on the second road segment, based on the second sensor data. Herein, the machine learning module 405 processes one or more of the map data or the first sensor data and the ground truth data for its training. The second sensor data is then passed onto the trained machine learning model 115 to predict the roadwork zone.

The method 500 also includes predicting, by the trained machine learning model 115, a start of the roadwork zone 107 on the second road segment for a vehicle travelling on the road based on the second sensor data indicating presence of one or more of roadwork announcement signs, chicane announcement signs, passing restriction signs, lane shift signs and lane markings change on the second road segment, and/or based on the determined increasing speed funnel for the second road segment, ahead of the vehicle. The method 500 further includes predicting, by the trained machine learning model 115, an end of the roadwork zone 107 on the second road segment for a vehicle travelling on the road based the second sensor data indicating at least one of absence of one or more of roadwork announcement signs, chicane announcement signs, passing restriction signs, lane shift signs and lane markings change within a predetermined length of the second road segment, and presence of speed limit increasing signs on the second road segment, and/or based on the determined decreasing speed funnel for the second road segment, ahead of the vehicle.

As previously discussed, the machine learning model 115 can be based on any supervised learning model (e.g., Random Forest, Decision Tree, Neural Net, Deep Learning, logistic regression, etc.). For example, in the case of a neural network, the machine learning model 115 can consist of multiple layers or collections of one or more neurons (e.g., processing units of the neural network) corresponding to a feature or attribute of the input data (e.g., the feature vector generated from the map and/or vehicular sensor data as described above). In some example embodiments, the machine learning model 115 may be resident to the vehicle (manual or autonomous) such that the prediction of the roadwork is done within the vehicle itself. For example, autonomous vehicles may pass through terrains where insufficient network connectivity may be available. As such the prediction may be made by the trained machine learning model within the vehicle itself. Alternately, in some example embodiments, the machine learning model 115 may be hosted on a cloud by for example the map developer of the geographic database. In this way, resource intensive processing may be carried out in the cloud itself without requiring dedicated hardware for the same on the vehicle. In some example embodiments, the machine learning model 115 may be available to both the cloud as well as the vehicle to support prediction in all scenarios.

During training, the machine learning module 405 uses a learner module that feeds feature vectors from the training data set (e.g., created from map and/or sensor data as described above) into the machine learning model 115 to compute a predicted matching feature (e.g., roadwork zone and/or other related characteristic to be predicted) using an initial set of model parameters (like, the first sensor data). For example, the target prediction for the machine learning model 115 can be whether there is a roadwork zone present for a given segment (e.g., the second road segment) of a road of interest. In one embodiment, the machine learning model 115 can also be used to model or predict shape, distance from vehicle to the roadwork zone (e.g., from a vehicle reference point such as the rear axle), and/or other attributes of the roadwork zone 107 if the ground truth data contains attributes or feature labels. In addition, or alternatively, the machine learning model 115 can be used to predict a road characteristic related to the roadwork zone. The learner module then compares the predicted matching probability and the predicted feature to the ground truth data (e.g., the manually marked feature labels) in the training data set for each sensor data observation used for training. In addition, the learner module computes an accuracy of the predictions for the initial set of model parameters. If the accuracy or level of performance does not meet a threshold or configured level, the learner module incrementally adjusts the model parameters until the model generates predictions at a desired or configured level of accuracy with respect to the manually marked labels of the ground truth data. In other words, a "trained" machine learning model 115 is a model with model parameters adjusted to make accurate predictions with respect to the training data set and ground truth data.

Figure 7:
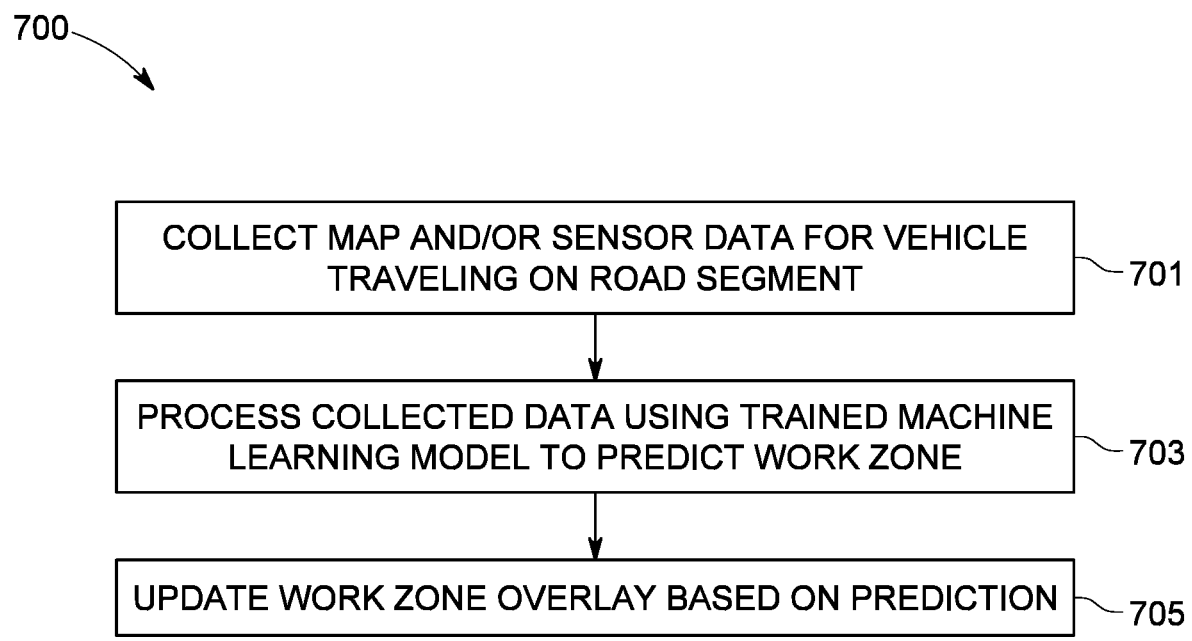
FIG. 7 is a flowchart of a method for maintaining roadwork zone overlay, according to one embodiment.

In one embodiment, the machine learning module 405 uses the trained machine learning model 115 to a maintain a roadwork zone overlay of a map representation of a road network. FIG. 7 is a flowchart of a process 700 for maintaining a roadwork zone overlay of a map representation of a road network. At step 701, for example, the machine learning module 405 can interact with the sensor data ingestion module 401 and map data module 403 to receive sensor data observations from OEM providers and/or vehicles traveling in the road network. In other words, in one embodiment, given the training data above, the roadwork zone platform 113 can run a batch process (e.g., every 24 hours or any other configured time interval) and extract the feature vectors as described above, and pass the feature vectors to the already trained machine learning model 115. At step 703, the trained machine learning model 115 may output whether the road segment (e.g., 5-meter segment) corresponding to the input feature vector contains a roadwork zone or not. At step 705, the roadwork zone overlay is updated based on the prediction. In some embodiments, the data publication module 407 can then publish the roadwork zone overlay in the geographic database 111 or equivalent for access by end users (e.g., OEMs, vehicles, maps, mobile phones, etc.).

According to one or more embodiments, the method 500 further includes determining road features based on the map data. The road features comprise information about one or more of roadwork zone definition based on a location of the road and historical speed of vehicles on the road. Further, the generated roadwork zone data is validated based on the determined road features. For instance, if the road feature indicates that the road forms part of a bridge or a tunnel, then gradual decrease in speed limits as indicated by road signs (decreasing speed funnel) may not be attributed due to presence of a roadwork zone, but instead due to the inherent characteristic/feature of the road, and thereby any prediction confirming presence of roadwork zone primarily due to decreasing speed funnel may be invalidated. Similarly, if the historical speed on a particular road segment may be low, then any prediction confirming presence of roadwork zone primarily due to low speed traffic behavior or the like may be invalidated. Generally, outside of the roadwork zone, the running speed of vehicles should be the same as the historical average speed of vehicles. In another embodiment, map data may further be useful since roadwork zone definition is very country specific. For example, yellow lane markings are used in Western Europe to indicate roadworks but in North America it indicates opposing traffic.

Figure 8:
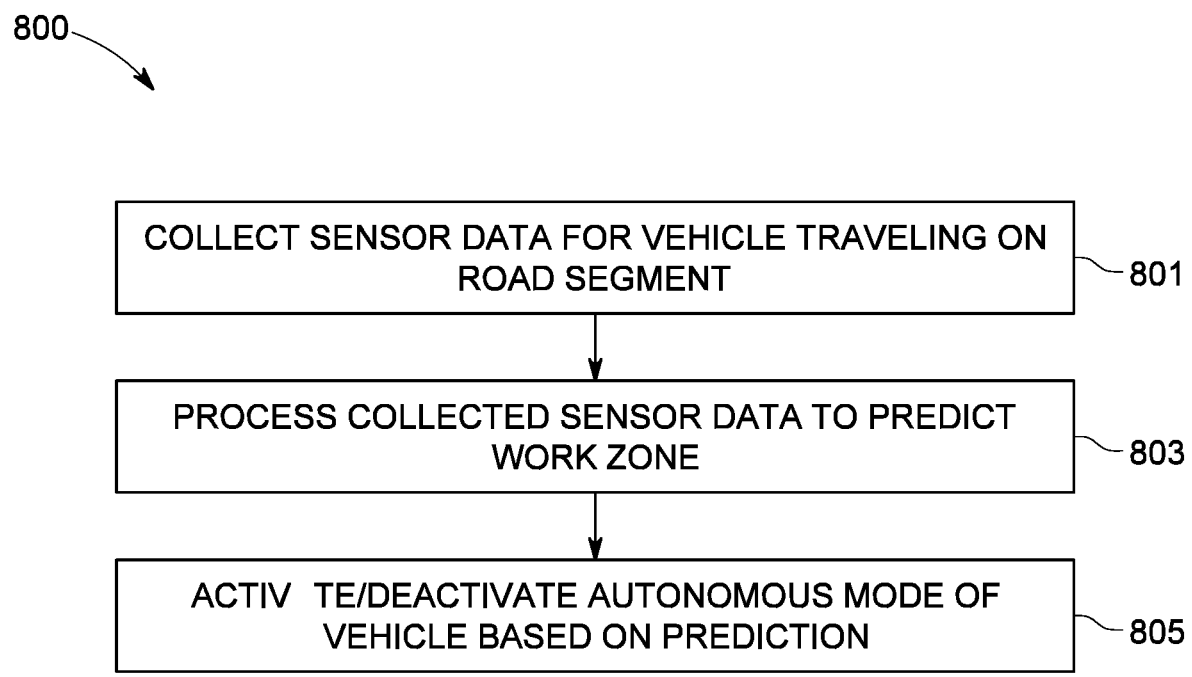
FIG. 8 is a flowchart of a process for controlling an autonomous vehicle using prediction of roadwork zone, according to one embodiment.

FIG. 8 is a flowchart of a process 800 for controlling an autonomous vehicle using prediction of presence or absence of roadwork zone, according to one embodiment. In various embodiments, the roadwork zone platform 113, roadwork zone module 119, and/or any of the modules 401-409 may perform one or more portions of the process 800 and may be implemented in, for instance, a chip set including a processor and a memory as shown in FIG. 12. As such, roadwork zone platform 113, roadwork zone module 119, and/or any of the modules 401-409 may provide means for accomplishing various parts of the process 800, as well as means for accomplishing embodiments of other processes described herein in conjunction with other components of the system 100. Although the process 800 is illustrated and described as a sequence of steps, it may be contemplated that various embodiments of the process 800 may be performed in any order or a combination and need not include all of the illustrated steps.

At step 801, the sensor data ingestion module 401 and/or the map data module 403 collect sensor data (i.e. second sensor data) from a vehicle traveling on a road segment. This step is equivalent to step 501 of the method 500 described above. However, in this use, the road segment of interest is a road segment for which a prediction of roadwork or other related characteristic is requested.

At step 803, the roadwork zone platform 113 processes the collected sensor data, to predict the presence of roadwork zone on the target road segment (as discussed in description of the method 500 of FIG. 5). Additionally, or as a part of the step 803, the roadwork zone platform 113 may communicate the prediction result to the vehicle.

At step 805, the vehicle control module 409 activates or deactivates an autonomous driving mode of the vehicle based on the predicted presence or the predicted absence of the roadwork zone on the road ahead of direction of travel of a target vehicle. In addition, or alternatively, the vehicle control module 409 may present a notification to the driver or occupant of the vehicle prior to activating or deactivating the autonomous mode. For example, the notification may alert the driver that a change in the autonomous mode will occur shortly (e.g., within a specified period of time). In another example, the notification may provide the driver an option to accept or reject the pending change in autonomous driving mode.

By way of example, the vehicle may be an autonomous vehicle or highly assisted driving vehicle that is capable of sensing its environment and navigating within a road network without driver or occupant input. It is noted that autonomous vehicles and highly assisted driving vehicles are part of a spectrum of vehicle classifications that may span from no automation to fully autonomous operation. For example, the U.S. National Highway Traffic Safety Administration ("NHTSA") in its "Preliminary Statement of Policy Concerning Automated Vehicles," published 2013, defines five levels of vehicle automation:

Level 0 (No-Automation)—"The driver is in complete and sole control of the primary vehicle controls—brake, steering, throttle, and motive power—at all times.";

Level 1 (Function-specific Automation)—"Automation at this level involves one or more specific control functions. Examples include electronic stability control or pre-charged brakes, where the vehicle automatically assists with braking to enable the driver to regain control of the vehicle or stop faster than possible by acting alone.";

Level 2 (Combined Function Automation)—"This level involves automation of at least two primary control functions designed to work in unison to relieve the driver of control of those functions. An example of combined functions enabling a Level 2 system is adaptive cruise control in combination with lane centering.";

Level 3 (Limited Self-Driving Automation)—"Vehicles at this level of automation enable the driver to cede full control of all safety-critical functions under certain traffic or environmental conditions and in those conditions to rely heavily on the vehicle to monitor for changes in those conditions requiring transition back to driver control. The driver is expected to be available for occasional control, but with sufficiently comfortable transition time."; and Level 4 (Full Self-Driving Automation)—"The vehicle is designed to perform all safety-critical driving functions and monitor roadway conditions for an entire trip. Such a design anticipates that the driver will provide destination or navigation input but is not expected to be available for control at any time during the trip. This includes both occupied and unoccupied vehicles."

The various embodiments described herein are applicable to vehicles that are classified in any of the levels of automation (levels 0-4) discussed above. For example, in the case of autonomous modes of operation, the vehicle may automatically react to detected roadwork (e.g., by automatically rerouting, slowing down, etc.). Even in the case of completely manual driving (e.g., level 0), the vehicle may present an alert or notification of any predicted roadwork zone to provide greater situational awareness and improve safety for drivers.

In one or more embodiments, the autonomous driving mode of the vehicle travelling on the road is regulated based on the prediction about the roadwork zone ahead on the road. In particular, the vehicle control module 409 deactivates the autonomous driving mode of a target vehicle travelling on the road based on the trained machine learning model predicting start of the roadwork zone (determined, as discussed above) on the road segment ahead of the target vehicle. And, the vehicle control module 409 activates the autonomous driving mode of a target vehicle travelling on the road based on the machine learning model predicting end of the roadwork zone (determined, as discussed above) on the road segment ahead of the target vehicle.

In another use case, in addition to or instead of autonomous vehicle control, the data publication module 407 may initiate an update of roadwork overlay of a map database based on the predicted presence or the predicted absence of the roadwork zone on the road segment. For example, if the segment has been previously unmapped, the predicted roadwork zone may be transmitted for possible inclusion in roadwork overlay of the geographic database 111. The roadwork zone platform 113 may use any criteria for determining whether a new roadwork zone prediction should be incorporated into an existing roadwork zone overlay. For example, if the report is from a trusted vehicle (e.g., a mapping vehicle operated by a map provider), a single prediction may be used to update the roadwork zone overlay. If the report is from a user vehicle, the roadwork zone platform 113 may update the roadwork zone overlay only if the report meets predetermined criteria (e.g., confirmed by a predetermined number of other user vehicles, has calculated probability of the presence of the roadwork zone above a threshold value, etc.).

Figure 9:
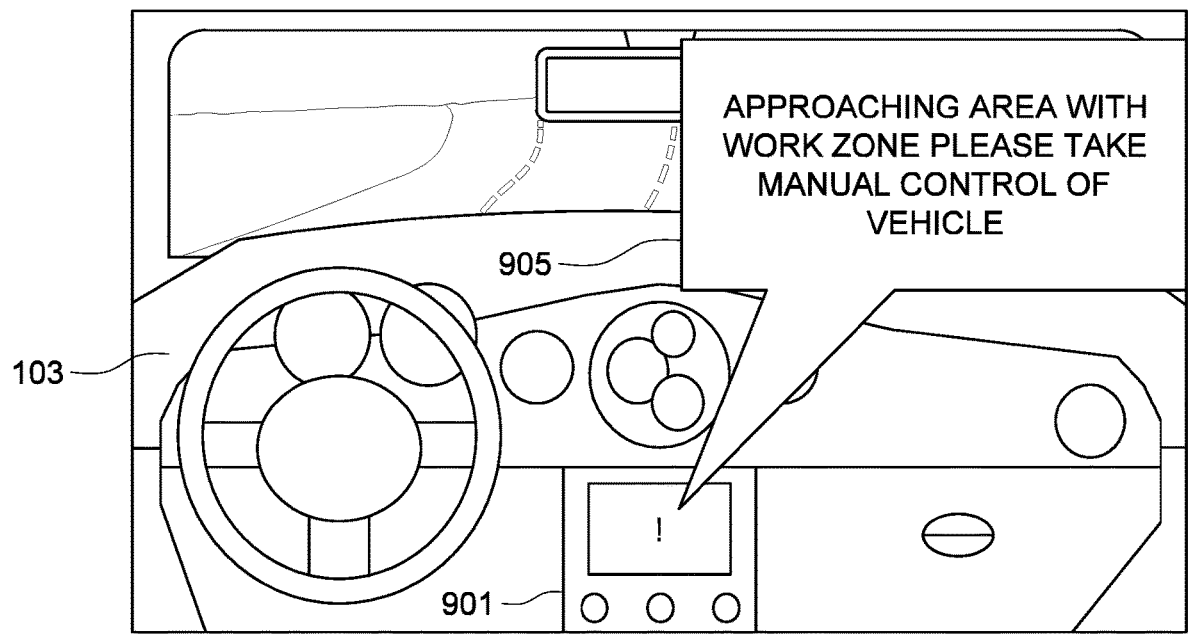
FIG. 9 is a diagram of example user interfaces based on prediction of roadwork zone, according to on embodiment.

FIG. 9 is a diagram of example user interface, according to one embodiment. In the example of FIG. 9, the vehicle 103 is traveling on a road segment that has not been previously mapped for the presence of any roadwork zone. The vehicle 103 also is currently operating in autonomous driving mode. When the vehicle 103 approaches the segment the present system 100 processes map and sensor data associated with the segment to make a roadwork zone prediction (as discussed). Alternatively, the map and sensor data associated with the segment may already be preprocessed in the system 100. The system 100 then presents the result on a vehicle system 901 of the vehicle 103. This validation then triggers the vehicle system 901 to present a notification or an alert message 905 to indicate that that the vehicle is approaching an area with roadwork zone and instructs the driver to take manual control for the segment or to activate other advance sensors (e.g. Lidar, Infrared) that could help the vehicle to navigate in the road work zone. In addition, the vehicle system 901 may deactivate the autonomous driving mode (e.g., following a period of time after presenting a notification such as the alert message 905).

Referring back to FIG. 1, in one embodiment, the roadwork zone platform 113 has connectivity over a communication network 125 to the services platform 121 (e.g., an OEM platform) that provides one or more services 123 (e.g., sensor data collection services). By way of example, the services 123 may also be other third-party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services platform 121 uses the output (e.g. roadwork zone prediction) from the roadwork zone platform 113 to provide services such as navigation, mapping, other location-based services, etc. In one embodiment, the roadwork zone platform 113 may be a platform with multiple interconnected components. The roadwork zone platform 113 may include multiple servers, intelligent networking devices, computing devices, components and corresponding software for providing parametric representations of lane lines. In addition, it is noted that the roadwork zone platform 113 may be a separate entity of the system 100, a part of the one or more services 123, a part of the services platform 121, or included within the vehicle 103 (e.g., a roadwork zone module 119).

In one embodiment, content providers 127a-127m (collectively referred to as content providers 127) may provide content or data (e.g., including geographic data, parametric representations of mapped features, etc.) to the geographic database 111, the roadwork zone platform 113, the services platform 121, the services 123, and the vehicle 103. The content provided may be any type of content, such as map content, textual content, audio content, video content, image content, etc. In one embodiment, the content providers 127 may provide content that may aid in the detecting and classifying of roadwork zone or other related characteristics. In one embodiment, the content providers 127 may also store content associated with the geographic database 111, roadwork zone platform 113, services platform 121, services 123, and/or vehicle 103. In another embodiment, the content providers 127 may manage access to a central repository of data, and offer a consistent, standard interface to data, such as a repository of the geographic database 111.

By way of example, the roadwork zone module 119 may be any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the roadwork zone module 119 may support any type of interface to the user (such as "wearable" circuitry, etc.). In one embodiment, the roadwork zone module 119 may be associated with the vehicle 103 or be a component part of the vehicle 103.

In one embodiment, the vehicle 103 is configured with various sensors for generating or collecting sensor data, related geographic/map data, etc. In one embodiment, the sensed data represent sensor data associated with a geographic location or coordinates at which the sensor data was collected. In this way, the sensor data may act as observation data that may be separated into location-aware training and evaluation datasets according to their data collection locations. By way of example, the sensors may include a radar system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC), etc.), temporal information sensors, a camera/imaging sensor for gathering image data, an audio recorder for gathering audio data, velocity sensors mounted on steering wheels of the vehicles, switch sensors for determining whether one or more vehicle switches are engaged, and the like.

Other examples of sensors of the vehicle 103 may include light sensors, orientation sensors augmented with height sensors and acceleration sensor (e.g., an accelerometer may measure acceleration and may be used to determine orientation of the vehicle), tilt sensors to detect the degree of incline or decline of the vehicle along a path of travel, moisture sensors, pressure sensors, etc. In one scenario, the sensors may detect weather data, traffic information, or a combination thereof. In one embodiment, the vehicle 103 may include GPS or other satellite-based receivers to obtain geographic coordinates from satellites for determining current location and time. Further, the location may be determined by visual odometry, triangulation systems such as A-GPS, Cell of Origin, or other location extrapolation technologies. In yet another embodiment, the sensors may determine the status of various control elements of the car, such as activation of wipers, use of a brake pedal, use of an acceleration pedal, angle of the steering wheel, activation of hazard lights, activation of head lights, etc.

In one embodiment, the communication network 125 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multisubsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the roadwork zone platform 113, services platform 121, services 123, vehicle 103, and/or content providers 127 communicate with each other and other components of the system 100 using well known, new or still developing protocols. In this context, a protocol includes a set of rules defining how the network nodes within the communication network 125 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 10:
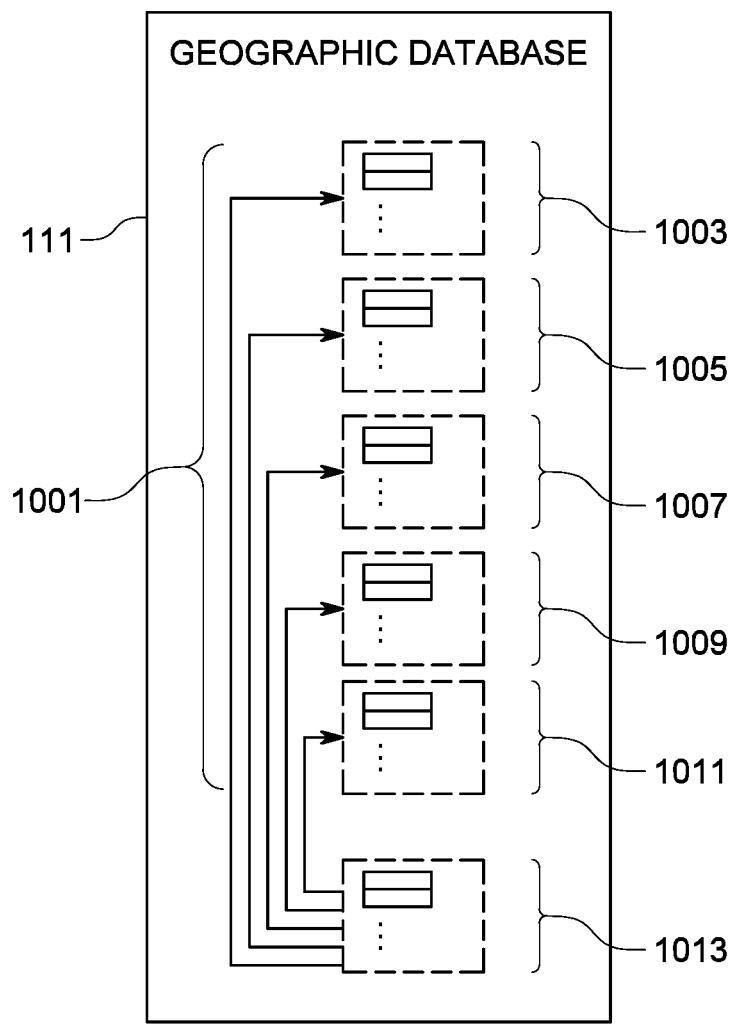
FIG. 10 is a diagram of a geographic database, according to one embodiment.

FIG. 10 is a diagram of a geographic database, according to one embodiment. In one embodiment, the geographic database 111 includes geographic data 1001 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon may be used to represent a footprint of the building, and a three-dimensional polygon extrusion may be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein may be used interchangeably.

In one embodiment, the following terminology applies to the representation of geographic features in the geographic database 111.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non-reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 111 follows certain conventions. For example, links do not cross themselves and do not cross each other except at a node. Also, there are no duplicated shape points, nodes, or links. Two links that connect each other have a common node. In the geographic database 111, overlapping geographic features are represented by overlapping polygons. When polygons overlap, the boundary of one polygon crosses the boundary of the other polygon. In the geographic database 111, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 111 includes node data records 1003, road segment or link data records 1005, POI data records 1007, roadwork records 1009, other records 1011, and indexes 1013, for example. More, fewer or different data records may be provided. In one embodiment, additional data records (not shown) may include cartographic ("carto") data records, routing data, and maneuver data. In one embodiment, the indexes 1013 may improve the speed of data retrieval operations in the geographic database 111. In one embodiment, the indexes 1013 may be used to quickly locate data without having to search every row in the geographic database 111 every time it is accessed. For example, in one embodiment, the indexes 1013 may be a spatial index of the polygon points associated with stored feature polygons.

In exemplary embodiments, the road segment data records 1005 are links or segments representing roads, streets, or paths, as may be used in the calculated route or recorded route information for determination of one or more personalized routes. The node data records 1003 are end points corresponding to the respective links of the road segment data records 1005. The road link data records 1005 and the node data records 1003 represent a road network, such as used by vehicles, cars, and/or other entities. Alternatively, the geographic database 111 may contain path segment and node data records or other data that represent pedestrian paths or areas in addition to or instead of the vehicle road record data, for example.

The road/link segments and nodes may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 may include data about the POIs and their respective locations in the POI data records 1007. The geographic database 111 may also include data about places, such as cities, towns, or other communities, and other geographic features, such as bodies of water, mountain ranges, etc. Such place or feature data may be part of the POI data records 1007 or may be associated with POIs or POI data records 1007 (such as a data point used for displaying or representing a position of a city).

In one embodiment, the geographic database 111 may also include roadwork records 1009 for storing predicted roadwork zones and other related road characteristics. The predicted data, for instance, may be stored as attributes or data records of a roadwork zone overlay, which fuses with the predicted attributes with map attributes or features. In one embodiment, the roadwork records 1009 may be associated with segments of a road link (as opposed to an entire link). It is noted that the segmentation of the road for the purposes of roadwork zone prediction may be different than the road link structure of the geographic database 111. In other words, the segments may further subdivide the links of the geographic database 111 into smaller segments (e.g., of uniform lengths such as 5-meters). In this way, roadwork zone may be predicted and represented at a level of granularity that is independent of the granularity or at which the actual road or road network is represented in the geographic database 111. In one embodiment, the roadwork records 1009 may be associated with one or more of the node records 1003, road segment records 1005, and/or POI data records 1007; or portions thereof (e.g., smaller or different segments than indicated in the road segment records 1005) to provide situational awareness to drivers and provide for safer autonomous operation of vehicles. In this way, the predicted roadwork zone stored in the roadwork records 1009 may also be associated with the characteristics or metadata of the corresponding record 1003, 1005, and/or 1007.

In one embodiment, the geographic database 111 may be maintained by the content provider 127 in association with the services platform 121 (e.g., a map developer). Alternately, in some example embodiments, the geographic database 111 may be maintained by the map developer. The map developer may be same or different from the entity that owns or operates one or more functionalities of the system 100. In some example embodiments, the geographic database 111 may be a part of the work zone platform 113 itself. As such, both the work zone platform 113 and the geographic database 111 may be owned and obtained by a single entity. The map developer may collect geographic data to generate and enhance the geographic database 111. There may be different ways used by the map developer to collect data. These ways may include obtaining data from other sources, such as municipalities or respective geographic authorities. In addition, the map developer may employ field personnel to travel by vehicle along roads throughout the geographic region to observe features (e.g., roadwork zone) and/or record information about them, for example. Also, remote sensing, such as aerial or satellite photography, may be used.

The geographic database 111 may be a master geographic database stored in a format that facilitates updating, maintenance, and development. For example, the master geographic database or data in the master geographic database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 103, for example. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

The processes described herein for providing prediction of roadwork zone may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
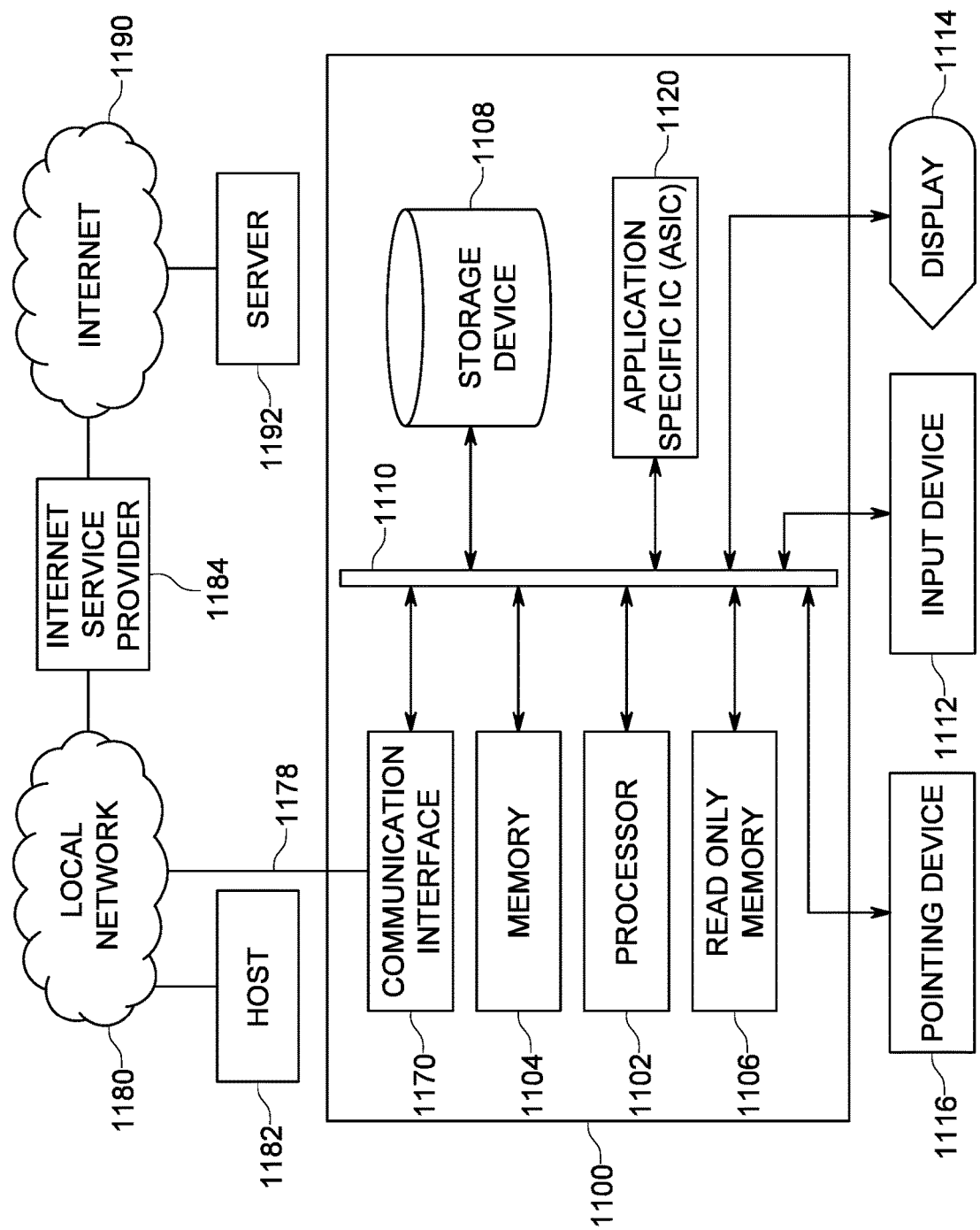
FIG. 11 is a diagram of hardware that may be used to implement an embodiment.

FIG. 11 illustrates a computer system 1100 upon which an embodiment of the invention may be implemented. Computer system 1100 is programmed (e.g., via computer program code or instructions) to provide prediction of roadwork zone (as described herein) and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena may represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to providing prediction of roadwork zone. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that may be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for prediction of roadwork zone. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing prediction of roadwork zone, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general, the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 125 for providing prediction of roadwork zone.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer may read.

FIG. 12 illustrates a chip set 1200 upon which an embodiment of the invention may be implemented. Chip set 1200 is programmed to provide prediction of roadwork zone (as described herein) and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set may be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively, or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 may be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide prediction of roadwork zone. The memory 1205 also stores the data associated with or generated by the execution of the inventive steps.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features may be arranged in any combination and order.

What is claimed is:

1. A computer-implemented method for prediction of a roadwork zone, the method comprising:
   dividing a road into a plurality of segments of pre-determined length, wherein the plurality of segments include a first road segment and a second road segment;
   processing map data included in a geographic database and associated with the first road segment, and first sensor data associated with the first road segment, to determine a presence or an absence of the roadwork zone on the first road segment, wherein the first sensor data include traffic sign information on the first road segment, probe data of one or more vehicles travelling on the first road segment, and a change in lane markings of the first road segment by discerning a color of the lane markings from a background of the first road segment;
   processing second sensor data associated with the second road segment;
   determining a presence of the roadwork zone on the second road segment based on the map data, the first sensor data, and the second sensor data;
   determining a target vehicle is approaching the second road segment with the roadwork zone; and
   generating a notification and deactivating an autonomous driving mode of the target vehicle within a pre-determined duration threshold.

2. The method of claim 1, further comprising:
   determining an increasing speed funnel based on two or more consecutive speed limit signs indicating a gradual reduction in speed limit or a decreasing speed funnel based on two or more consecutive speed limit signs indicating a gradual increase in speed limit; and determining a change in traffic speed for the first road segment and the second road segment based on the increasing speed funnel or the decreasing speed funnel.

3. The method of claim 2, further comprising:
   determining an end of the roadwork zone on the second road segment based on the second sensor data, wherein the second sensor data indicate an absence of the traffic sign information pertaining to roadwork and a presence of the decreasing speed funnel; and
   activating the autonomous driving mode of the target vehicle travelling on the second road segment based on the determination.

4. The method of claim 1, wherein the map data comprises information on functional class, number of lanes, speed limits, rural flag, urban flag, tunnel flag, bridge flag, or a combination thereof associated with each of the first road segment and the second road segment.

5. The method of claim 4, further comprising:
   determining one or more road features based on the map data, wherein the road features comprise information about one or more of roadwork zone information based on a location of a road segment and historical speed of the one or more vehicles travelling on the road segment; and
   validating the roadwork zone based on the one or more road features.

6. The method of claim 1, further comprising:
   processing changes in nominal speed and traffic direction of the one or more vehicles travelling in the first road segment; and
   determining a change in traffic behavior in the first road segment based on average speed for a pre-determined time period of the one or more vehicles in the first road segment.

7. The method of claim 1, wherein the pre-determined length of the plurality of segments include road segments with shorter length for higher resolution of detection of the roadwork zone or lengthier road segments for reducing memory storage.

8. The method of claim 1, further comprising:
   processing the first sensor data and the second sensor data from the one or more vehicles travelling on the plurality of road segments to determine a derivative feature, wherein the derivative feature includes a number of positive observations of the roadwork zone in at least one road segment of the plurality of road segments based on total number of vehicles traversing the least one road segment.

9. The method of claim 1, further comprising:
   processing the map data, the first sensor data, the second sensor data, or a combination thereof to extract a feature vector comprising one or more attributes of the map data, the first sensor data, the second sensor data, or a combination thereof, wherein the feature vector is applied as a training data for predicting the presence or the absence of the roadwork zone; and retrieving ground truth data for the first road segment, the second road segment, based on the feature vector to indicate the presence or the absence of the roadwork zone.

10. The method of claim 9, further comprising:

computing a predicted matching feature based on the feature vector;

determining an accuracy level of the predicted matching feature is below a threshold level based upon comparison of the predicted matching feature and the ground truth data; and adjusting one or more parameters of the predicted matching feature to generate a prediction at the threshold level.

11. The method of claim 10, further comprising:

updating an existing roadwork zone overlay with the predicted matching feature based upon satisfaction of a pre-determined criteria.

12. A system for prediction of a roadwork zone, the system comprising:

at least one memory configured to store computer program code instructions; and at least one processor configured to execute the computer program code instructions to:

divide a road into a plurality of segments of pre-determined length, wherein the plurality of segments include a first road segment and a second road segment;

process map data included in a geographic database and associated with the first road segment, and first sensor data associated with the first road segment, to determine a presence or an absence of a roadwork zone on the first road segment, wherein the first sensor data include traffic sign information on the first road segment, probe data of one or more vehicles travelling on the first road segment, and a change in lane markings of the first road segment by discerning a color of the lane markings from a background of the first road segment;

process second sensor data associated with the second road segment;

determine a presence of the roadwork zone on the second road segment based on the map data, the first sensor data, and the second sensor data;

determine a target vehicle is approaching the second road segment with the roadwork zone; and generate a notification and deactivate an autonomous driving mode of the target vehicle within a pre-determined duration threshold.

13. The system of claim 12, wherein the at least one processor is further configured to:

determine an increasing speed funnel based on two or more consecutive speed limit signs indicating a gradual reduction in speed limit or a decreasing speed funnel based on two or more consecutive speed limit signs indicating a gradual increase in speed limit; and determine a change in traffic speed for the first road segment and the second road segment based on the increasing speed funnel or the decreasing speed funnel.

14. The system of claim 13, further comprising:

determine an end of the roadwork zone on the second road segment based on the second sensor data, wherein the second sensor data indicate an absence of the traffic sign information pertaining to roadwork and a presence of the decreasing speed funnel; and activate the autonomous driving mode of the target vehicle travelling on the second road segment based on the determination.

15. The system of claim 12, wherein the at least one processor is further configured to:

process changes in nominal speed and traffic direction of the one or more vehicles travelling in the first road segment; and determine a change in traffic behavior in the first road segment based on average speed for a pre-determined time period of the one or more vehicles in the first road segment.

16. The system of claim 12, wherein the at least one processor is further configured to:

process the first sensor data and the second sensor data from the one or more vehicles travelling on the plurality of road segments to determine a derivative feature, wherein the derivative feature includes a number of positive observations of the roadwork zone in at least one road segment of the plurality of road segments based on total number of vehicles traversing the least one road segment.

17. The system of claim 12, wherein the at least one processor is further configured to:

process the map data, the first sensor data, the second sensor data, or a combination thereof to extract a feature vector comprising one or more attributes of the map data, the first sensor data, the second sensor data, or a combination thereof, wherein the feature vector is applied as a training data for predicting the presence or the absence of the roadwork zone; and retrieve ground truth data for the first road segment, the second road segment, based on the feature vector to indicate the presence or the absence of the roadwork zone.

18. A non-transitory computer-readable storage medium for prediction of a roadwork zone on a road, carrying one or more sequences of one or more instructions which, when executed by one or more processors, cause an apparatus to perform:

dividing a road into a plurality of segments of pre-determined length, wherein the plurality of segments include a first road segment and a second road segment;

processing map data included in a geographic database and associated with the first road segment, and first sensor data associated with the first road segment, to determine a presence or an absence of a roadwork zone on the first road segment, wherein the first sensor data include traffic sign information on the first road segment, probe data of one or more vehicles travelling on the first road segment, and a change in lane markings of the first road segment by discerning a color of the lane markings from a background of the first road segment;

processing second sensor data associated with the second road segment;

determining a presence of the roadwork zone on the second road segment based on the map data, the first sensor data, and the second sensor data;

determining a target vehicle is approaching the second road segment with the roadwork zone; and generating a notification and deactivate an autonomous driving mode of the target vehicle within a pre-determined duration threshold.

\* \* \* \* \*